United States Patent [19]

Katoh

[11] Patent Number: 4,885,610

[45] Date of Patent: Dec. 5, 1989

[54] DEVICE FOR FEEDING ORIGINALS TO A COPYING MACHINE

[75] Inventor: Kazuyuki Katoh, Tokyo, Japan

[73] Assignee: Ricoh Company, Ltd., Tokyo, Japan

[21] Appl. No.: 131,925

[22] Filed: Dec. 11, 1987

[30] Foreign Application Priority Data

Dec. 15, 1986 [JP] Japan .......................... 61-191743[U]

[51] Int. Cl.$^4$ .............................................. G03G 15/00
[52] U.S. Cl. ...................................... 355/233; 355/318; 355/50
[58] Field of Search ................. 355/35 H, 14 SH, 8, 355/23, 50, 51, 233, 309, 318; 271/3.1, 9, 3

[56] References Cited

U.S. PATENT DOCUMENTS 4,316,667 2/1982 Edwards et al. ................. 355/3 SH Primary Examiner—Arthur T. Grimley
Assistant Examiner—J. Pendegrass
Attorney, Agent, or Firm—Cooper & Dunham

[57] ABSTRACT

A copying machine including a light exposure device having a stationary light source for illuminating an original to be copied and adapted to form an electrostatic latent image on a photo-sensitive member through exposure by said light exposure device. A copying machine provided with a first insertion port and a transfer means adapted to feed an original to be copied from the first insertion port to the discharge position through the light exposure position so as to transfer an original to be copied, a second insertion port for inserting an original to be copied from the direction different from the first insertion port and a second transfer means adapted to reverse the feeding direction and the surface of the original to be copied from said second insertion port and feed the same to the exposure position.

7 Claims, 1 Drawing Sheet

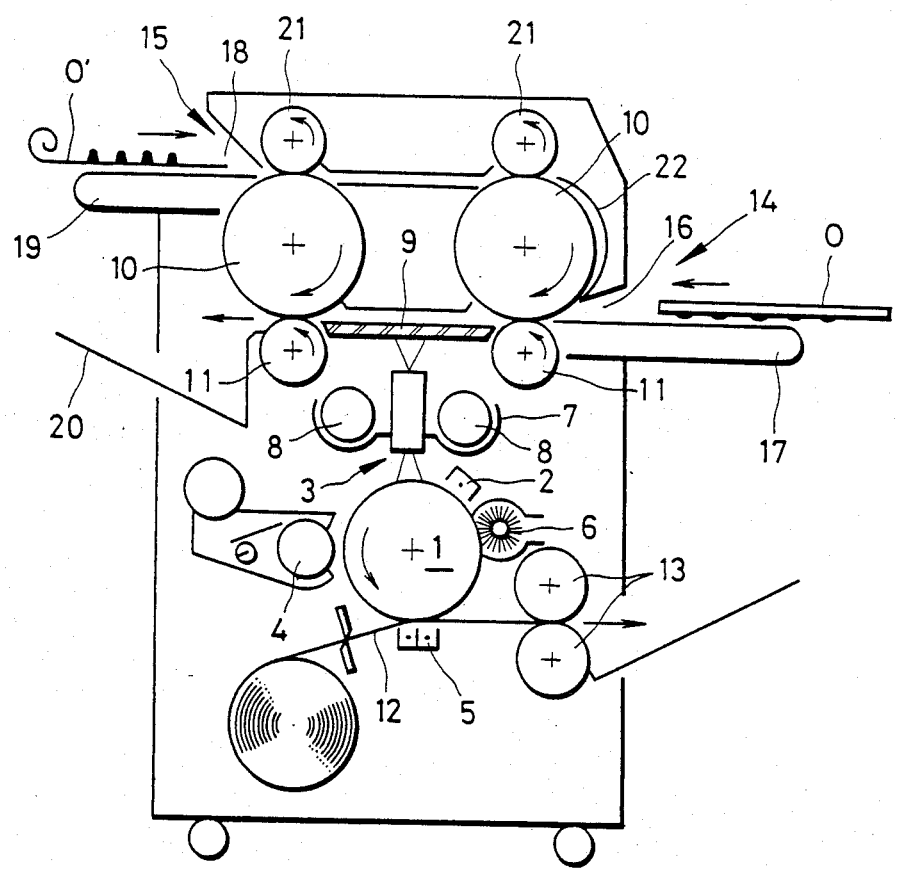

DEVICE FOR FEEDING ORIGINALS TO A COPYING MACHINE

FIELD OF THE INVENTION AND RELATED ART STATEMENT

The present invention relates to a copying machine in which the original to be copied is transfered and it is illuminated by the light projected from a stationary light source during movement of the original.

Copying machines of the type as above mentioned is known as a so-called original moving type. According to the copying machines of this type, when the original was to be exposed to the light, it was made in contact with a sheet of glass, such that flatness might be kept and then illuminated by a stationary light source. When as viewed in the vertical direction, it was usual that the optical system was provided above the photo-sensitive member, said glass was provided above said optical system and the original to be copied was moved above the glass sheet. From this arrangement, such a copying machine as the original to be copied is inserted with the surface to be copied facing downwardly is already suggested. However when the original to be copied is made to face downwardly, it has become difficult to recognize the content and location of what is written in the original to be copied as well as it would also be difficult to intentionally displace the copying position for certain purposes. Particularly inconvenience has been experienced in case of providing a composite copy of drawings or the like.

It is sometimes desired to place the original to be copied facing upwardly in such cases as not only of displacement of the copying position and provision of a composite copy but also of inserting the original to be copied into the copier ascertaining what is written on the original. In such cases, the original has to be reversed by 180 degrees when it arrives at the position of exposure and for this purpose such a mechanism as to reverse the faces of an original had to be separately arranged.

It is understood that the original to be copied may be easily reversed by 180 degrees by use of a reversing roller or the like and transported to the position of exposure if the original is thin and flexible. It is to be noted however that if the original is rigid and thick, the diameter of the reversing roller or the like has to be considerably increased enough to execute reversing and because of this, a large space for accommodation is required. On the other hand if the diameter of such a reversing roller is limited to a certain size, there has been caused such problems as the dimensions of the original to be copied had to be accordingly.

OBJECT AND SUMMARY OF THE INVENTION

An object of the present invention is to eliminate the problems of prior arts as above mentioned and provide such a copying machine as the original to be copied may be inserted into the machine with the face to be copied facing either upwardly or downwardly.

The present invention has attained this object by providing at least two insertion portions, comprising the first insertion portion where the face of an original to be copied is inserted into the copying machine facing downwardly and the second insertion portion where the face of an original to be copied is inserted into the copying machine facing upwardly.

The present invention has largely improved operation efficiency at the time of copying work owing to the above-mentioned constitution through provision of insertion portions capable of inserting the face of an original to be copied facing both upwardly and downwardly. The present invention has also enabled any sort of and any conditions of originals to be copied successfully.

BRIEF DESCRIPTION OF THE DRAWINGS

The accompanying drawing is an overall explanatory view of a copying machine showing an embodiment of the present invention.

DESCRIPTION OF THE PREFERRED EMBODIMENT

An embodiment of the present invention will now be explained by referring to the accompanying drawing.

In the drawing, numeral 1 designates a photosensitive drum around which are provided a charger 2, a light exposing device 3, a development device 4, a transferring and separating device 5 and a cleaning device 6. The exposing device 3 includes one or plurality of stationary light source(s) 8 and a self-focusing light transmitting elements array (hereinafter SLA) 7 adapted to direct the light reflected from the original to be copied. Disposed on the exposing apparatus 3 is a sheet of glass 9 adapted to maintain flatness of the original to be copied. Rollers for feeding the originals are provided in pairs at both the inlet and exit sides of the glass 9. Each pair of rollers comprise a first feeding roller 10 of a larger diameter and a second feeding roller 11 of a smaller diameter in contact with the lower part of the first feeding roller 10.

In the copying machine constructed as above, when the photo-sensitive drum 1 is rotatably driven in a direction indicated by the arrow, a photo-sensitive layer of the photo-sensitive drum 1 is charged by the charger 2 and then subjected to exposure by the light exposing device 3. At this instance, the original to be copied is nipped by the first and second feeding rollers 10, 11 and transferred in a direction indicated by the arrow at a predetermined speed and then illuminated by the light source 8. The light image thus produced is focused on the photo-sensitive drum 1 through the SLA 7. In this way electrostatic latent image corresponding to the original to be copied is formed on the photosensitive layer and this latent image is made visible by the developing device 4. Then this visible image is transferred to a transfer sheet 12 through operation of the transferring and separating device 5. The transfer sheet 12 is then separated from the photo-sensitive drum 1. It is to be noted that subsequently to separation, the transfer sheet 12 is fixed by a fixing device 13 and discharged out of the copying machine. It is also to be noted that the photo-sensitive drum 1 is cleaned by the cleaning device 6 and made ready for the next copying operation.

In the copying machine which is operated in the manner as above mentioned, there are incorporated in accordance with the present invention the first insertion section 14 wherein the original to be copied is transferred with the face to be copied facing downwardly to the glass sheet 9 serving as the exposure section and the second insertion section 15 wherein the original to be copied is transferred with the face to be copied facing upwardly to the glass sheet 9. The first insertion section 14 includes a insertion port 16 provided in the tangential direction of the first and second transfer rollers 10, 11 and upstream thereof in the transferring direction and an insertion table 17 carrying the original to be copied for inserting the same into the insertion port 16. On the other hand, the second insertion section 15 includes an insertion port 18 and an insertion table 19 for carrying the original to be copied for inserting the same to the insertion port 18 which is provided at the side opposite to the first insertion section 14 or downstream thereof in the transferring direction as well as at the upper side location or the leftwardly in the drawing and in the tangential direction of the first transfer roller 10 at the upper portion thereof.

The original to be copied 0 which is to be inserted from the first insertion section 14 is inserted from the insertion port 16 with the face to be copied facing downwardly and subjected to exposure by the light exposing device 3 while it is nipped by the first and second transfer rollers 10, 11 and transferred. Then it will be discharged to a tray 20 for originals provided at the left side of a copying machine proper. In the meantime, the original to be copied O' which is inserted from the second insertion section 15 is inserted from the insertion port 18 with the face to be copied facing upwardly. In this case, a third transfer roller 21 is provided on the first transfer roller 10 and a reversing guide plate 22 is arranged along the right side of the circumference of the first transfer roller 10 on the right side. This arrangement will permit the original to be copied to be nipped by the third roller 21 and the first transfer roller 10 and reversed by the first transfer roller 10 on the right side and the reversing guide plate 22. The original to be copied thus reversed is turned with the face to be copied facing downwardly and transferred to the first and second transfer rollers 10, 11 in a similar manner to insertion of the original from the first insertion port 16 of the first insertion section 14 and arrives at the glass sheet 9 where exposure is executed. Then the original is discharged to the tray 20 for the originals.

Since two insertion sections are provided as above explained, an original of a normal sheet may be inserted by use of the second insertion section with the face to be copied facing upwardly thus improving operational efficiency of the copying machine. In case that an original to be copied which is so thick and difficult to be reversed is to be inserted, the first insertion section 14 may be used, so that the original may be transferred substantially linearly and copied without difficulties. It is further to be noted that when the second insertion section 15 is used, the face to be copied of the original in question may be observed so that composition of the image of the original, displacement of the originals and so forth may be executed accurately and easily. As the long original is frequently rolled with the face to be copied facing inwardly, if the original is inserted with the face to be copied facing upwardly, it is difficult to operate because the face is curled upwardly. In such an occasion, is the first insertion section is employed and the face of the original to be copied is caused to face downwardly, it will become easy to operate because the face is curled downwardly. In this manner, if the first insertion section 14 or the second insertion section 15 are selectively employed depending on how the face to be copied is curled, operation of the copying machine may be greatly enhanced.

Although a preferred embodiment of the present invention has been described as above, the present invention is understood to be not limited to the embodiment but may be modified in many ways. For instance, the number of the insertion sections should not be limited to two, but three or more of such sections may be employed and in the embodiment as above described, such insertion sections may be provided as the original may be inserted obliquely or vertically. It is further to be noted that the insertion section be not limited to such a one as the original will be manually inserted but such an automatic original feeding device (ADF) or the like may be provided at the location corresponding to the insertion base as required.

It is further naturally to be understood that the present invention may be applied not only to a copying machine as illustrated herein but to a facsimile device or the like. It is intended therefore that the term of a copying machine herein used should also imply a facsimile device or the like.

What is claimed is:

1. A copying machine comprising:
   a light exposure device having a stationary light source adapted to illuminate an original to be copied,
   a photo-sensitive member adapted to form an electrostatic latent image through exposure by a light exposure device,
   a first insertion port with an insertion table adapted to insert an original to be copied,
   a first transfer means adapted to feed the original to be copied inserted from the first insertion inlet directly to the position of discharging the same through the position of exposure,
   a second insertion port with an insertion table adapted to insert an original to be copied, and
   a second transfer means adapted to feed said original fed from said second insertion port by reversing the same by 180 degrees to the exposure position as well as to the position of discharging the same.

2. A copying machine as claimed in claim 1 wherein said first transfer means comprises two pairs of transfer rollers disposed respectively at the inlet side and the outlet side of said exposure position and said first insertion port is arranged at the position tangential to the pair of said transfer rollers at the entry side.

3. A copying machine as claimed in claim 2 wherein the second transfer means includes a guide path curved by 180 degrees vertically for directing an original to be copied to said transfer roller of said first transfer means disposed at the inlet side of said exposure position and at least one pair of transfer rollers provided between said guide plate and said second insertion port.

4. A copying machine as claimed in claim 3 wherein at least one roller of said at least one pair of transfer rollers for the second transfer means serves also as one roller of each pair of transfer rollers for the first transfer means.

5. A copying machine as claimed in claim 3 wherein one pair of the transfer rollers for the second transfer means are disposed above the transfer roller for the first transfer means disposed near said first insertion port.

6. A copying machine as claimed in claim 3 wherein the second transfer means includes two pairs of transfer rollers disposed above the respective pairs of the transfer rollers of the first transfer means.

7. A copying machine comprising:
   a light exposure device having a stationary light source adapted to illuminate an original to be copied, a photo-sensitive member adapted to form an electrostatic latent image through exposure by a light exposure device, two pairs of transfer rollers disposed at the entry side and the exit side of the exposure position for said light exposure device, a first insertion port disposed at the entry side in the tangential direction relative to the pair of transfer rollers at the entry side, a curved guide plate provided at the nip position of the pair of transfer rollers of the entry side along said transfer rollers, rollers disposed in pressing abutment with the upper rollers respectively of said two pairs of transfer rollers, and a second insertion port formed as a port at the position opposite to said first insertion port in the tangential direction relative to the roller disposed immediately above the upper roller of the pair of transfer rollers at the exit side.

* * * * *